Patented Feb. 10, 1925.

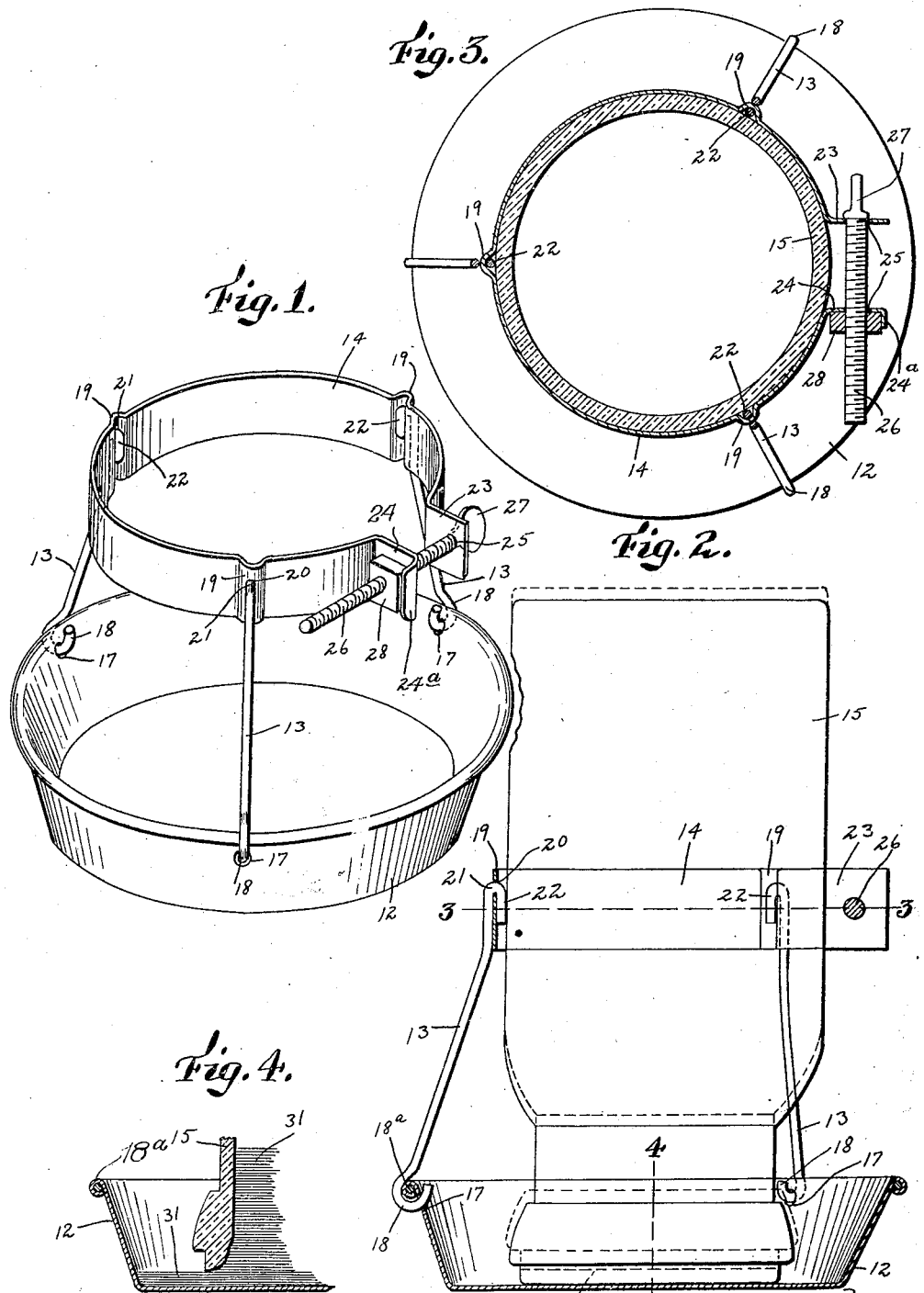

1,525,805

UNITED STATES PATENT OFFICE.

CHARLES H. FELKER, OF WOLLASTON, MASSACHUSETTS.

FLOW-REGULATING ATTACHMENT FOR INVERTED RECEPTACLES.

Application filed October 10, 1924. Serial No. 742,826.

*To all whom it may concern:*

Be it known that I, CHARLES H. FELKER, a citizen of the United States, residing at Wollaston, in the county of Norfolk and State of Massachusetts, have invented new and useful Improvements in Flow-Regulating Attachments for Inverted Receptacles, of which the following is a specification.

The object of this invention is to provide a simple and effective attachment, adapted to be used with a cylindrical receptacle, such as an ordinary glass fruit jar, to provide a device for feeding or watering chickens and other poultry, the attachment in which the invention is embodied being capable of ready application to fruit jars of different sizes, so that the attachment and a jar engaged therewith may be used for effecting a regulated flow of liquid or solid material from the inverted jar, into an annular space surrounding the mouth of the inverted jar.

Of the accompanying drawings forming a part of this application,—

Figure 1 is a perspective view of an attachment embodying the invention.

Figure 2 is a vertical sectional view of the same, showing a jar supported by the attachment.

Figure 3 is a section on line 3—3 of Figure 1.

Figure 4 is a fragmentary sectional view, showing the mouth of the receptacle separated from the bottom of the pan.

My improved attachment comprises a shallow pan 12, preferably circular, a plurality of preferably three wire struts 13, each engaged at one end with the curb of the pan, and a flexible clamping band 14, which is preferably a strip of resilient sheet metal, adapted to embrace a cylindrical receptacle 15, which may be an ordinary glass fruit jar. The band 14 is engaged with the opposite ends of the struts 13, and is provided with means for varying its diameter, and thereby adapting it to receptacles of different diameters. The struts are movable inward over the center of the pan, when the band is contracted, and outward from the center of the pan, when the band is expanded, so that the receptacle is maintained by the struts in a central position over the bottom of the pan. The attachment is adapted to support the receptacle 15 in an inverted position, either with its mouth in contact with the pan bottom, to seal the receptacle, as shown by full lines in Figure 2, or raised above said bottom to permit a limited flow of either liquid or solid material from the receptacle into the pan.

The struts 13 are preferably hinged loosely at their lower ends to the upper portion of the curb of the pan, hinge connections being provided, permitting the struts to swing toward and from a point over the center of the pan.

As here shown, the pan curb is provided with orifices 17 near its upper edge, the portions of the curb above the orifices forming hinge pintles, which are preferably reinforced by a marginal wire 18ᵃ (Figure 2), extending around the curb. The lower ends of the struts 13 are provided with eyes 18, loosely inserted in the orifices 7, and adapted to swing on the pintles.

The upper ends of the struts are preferably secured rigidly to the clamping band 14, the pan being provided with outwardly projecting spaced apart bosses 19, having apertures 20, and the upper end portions of the struts being provided with hooks which include necks 21, inserted in the orifices 20, and terminals 22 located in the bosses 20 and offset by the bosses from the internal surface of the pan, as best shown by Figure 3. The recesses formed by the inner sides of the bosses 19, are adapted to receive solder rigidly connecting the terminals 22 with the band.

I prefer to embody the means for varying the diameter of the pan in ears 23 and 24, projecting outwardly from the ends of the band and provided with orifices 25, and a thumb-screw 26, loosely inserted in said orifices, and provided with a head 27, bearing on the ear 23, and with a nut 28 bearing on the ear 24, and prevented from turning with the screw by a flange 24ᵃ, formed on the ear 24.

The receptacle 15 may be charged with any suitable material, such as sour milk, water, hard grain or grit, and is held with its mouth end upward, preparatory to the application of the attachment thereto. The band 14 being expanded to permit it to slip easily upon the receptacle 15, the bottom of the pan is moved downward to contact with the mouth of the receptacle, as shown by full lines in Figure 2, thereby closing the receptacle. The entire assemblage is then inverted, as indicated by Figure 2, and the receptacle is adjusted outward from the bottom of the pan, to provide an outlet at 30, adapted to permit a limited flow of either liquid or solid material from the receptacle into the annular marginal portion of the pan surrounding the receptacle mouth.

If the receptacle contains a liquid 31, a portion of the liquid will accumulate in the bottom of the pan as high as the distance between the mouth of the receptacle and the bottom of the pan, as shown by Figure 4. The depth of the accumulation may be varied by vertically adjusting the receptacle. When the desired adjustment is obtained, the band is tightened and firmly supports a receptacle.

When grain or grit is to be dispensed, the mouth of the receptacle will be located higher than is shown by Figure 4, and the material escaping will form a bank on the bottom of the pan, surrounding the mouth of the receptacle.

It will be seen that a feeding or watering device may be inexpensively provided by securing the described attachment to any of the well known forms of glass fruit jars, or other like cylindrical receptacles.

The pan is preferably made of aluminum, to adapt it to withstand the action of lactic acid contained in sour milk, and prevent rust and corrosion.

The attachment is preferably proportioned to fit any form of one quart fruit jars.

I claim:

1. A flow-regulating attachment for use with an inverted receptacle, comprising a pan, a plurality of struts, each engaged at one end with the curb of the pan, a flexible clamping band adapted to embrace a cylindrical receptacle and engaged with the opposite ends of the struts, and means for varying the diameter of the band, thereby adapting it to receptacles of different diameters, the struts being movable inward when the band is contracted, and outward when the band is expanded, so that the band is maintained in a central position over the bottom of the pan, and is adapted to support an inverted receptacle, either with its mouth in contact with the pan bottom to close the receptacle, or raised above said bottom to permit a limited flow from the receptacle into the pan.

2. A flow-regulating attachment for use with an inverted receptacle, comprising a pan, a plurality of struts hinged to the upper edge of the pan curb, and adapted to swing toward and from a point over the center of the pan bottom, a flexible clamping band adapted to embrace a cylindrical receptacle and engaged with the opposite ends of the struts, and means for varying the diameter of the band and thereby adapting it to receptacles of different diameters, the struts being hinged to swing inward when the band is contracted, and outward when the band is expanded, so that the band is maintained in a central position over the bottom of the pan, and is adapted to support an inverted receptacle, either with its mouth in contact with the pan bottom, to close the receptacle, or raised above said bottom to permit a limited flow from the receptacle into the pan.

3. A flow-regulating attachment for use with an inverted receptacle, comprising a pan, a plurality of struts, each engaged at one end with the curb of the pan, a flexible clamping band adapted to embrace a cylindrical receptacle and provided with outwardly projecting spaced apart bosses, having apertures, the opposite end portions of the struts being provided with hooks including necks inserted in said orifices, and terminals located in said bosses, and offset by the bosses from the internal surface of the band, and means for varying the diameter of the band, and thereby adapting it to receptacles of different diameters, the struts being movable inward when the band is contracted, and outward when the band is expanded, so that the band is maintained in a central position over the bottom of the pan, and is adapted to support an inverted receptacle, either with its mouth in contact with the pan bottom to close the receptacle, or raised above said bottom to permit a limited flow from the receptacle into the pan.

4. A flow-regulating attachment for use with an inverted receptacle, comprising a pan, a plurality of struts, each engaged at one end with the curb of the pan, a flexible clamping band adapted to embrace a cylindrical receptacle, and engaged with the opposite ends of the struts, the ends of the band being provided with outwardly projecting apertured ears, one of which has a flange, a thumb screw passing loosely through the ear apertures and provided with a head bearing on one ear, and with a nut prevented from turning with the screw by said flange, the rotation of said screw varying the diameter of the band, thereby adapting it to receptacles of different diameters, the struts being movable inward when the band is contracted, and outward when the band is expanded, so that the band is maintained in a central position over the bottom of the pan and is adapted to support an inverted receptacle, either with its mouth in contact with the pan bottom, to close the receptacle, or raised above said bottom to permit a limited flow from the receptacle into the pan.

In testimony whereof I have affixed my signature.

CHARLES H. FELKER.